April 29, 1958 C. R. WHITAKER 2,832,093
APPARATUS FOR EXTRUDING GROUND MEAT OR THE LIKE PRODUCTS
Filed June 4, 1956
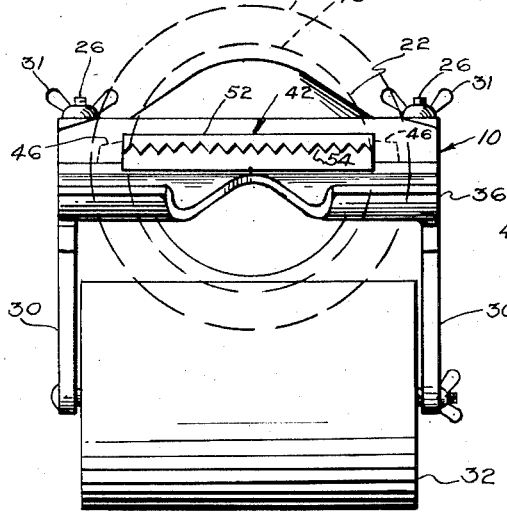
FIG.1.
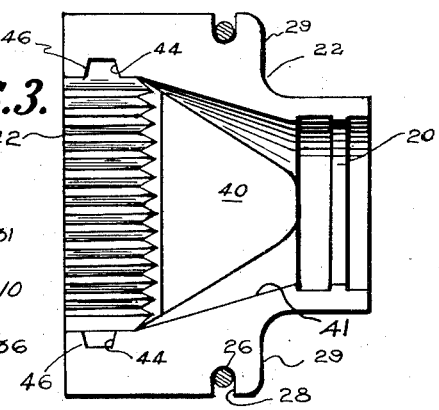
FIG.3.
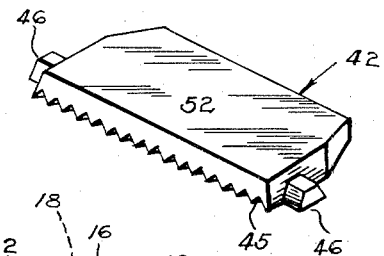
FIG.4.
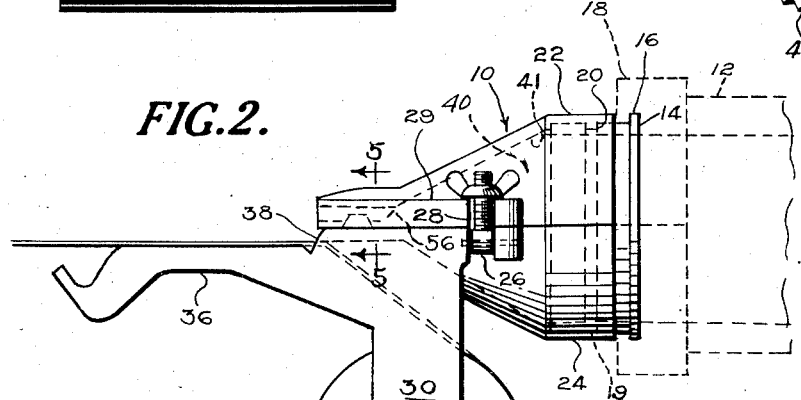
FIG.2.
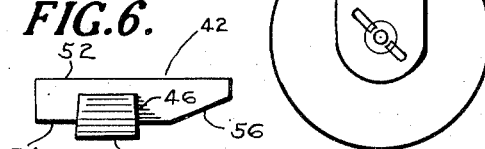
FIG.5.
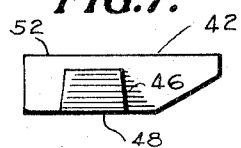
FIG.6.
FIG.7.
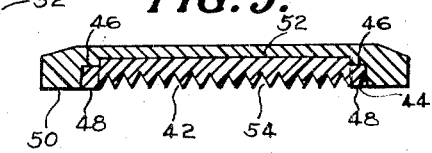
INVENTOR
Charles R. Whitaker
BY
Cushman, Darby & Cushman
ATTORNEYS

United States Patent Office 2,832,093
Patented Apr. 29, 1958

2,832,093

APPARATUS FOR EXTRUDING GROUND MEAT OR THE LIKE PRODUCTS

Charles R. Whitaker, Tulsa, Okla.

Application June 4, 1956, Serial No. 589,190

3 Claims. (Cl. 17—32)

The present invention relates to apparatus for extruding ground meat or like products into a flat strip of desired width and thickness. More particularly, the present invention relates to a nozzle structure adapted to be attached to a meat processing machine or the like, the nozzle extruding the product from the meat processing machine into a flat ribbon-like strip of desired width and thickness.

The nozzle structure of the present invention is adapted to be attached to the discharge outlet of a meat grinding machine, receiving the ground meat therefrom and molding it into a ribbon-like strip. As the meat is being molded into a strip by the nozzle structure, a sheet of paper is simultaneously and continuously fed under the strip of meat so that the meat may be subsequently cut into and sold as meat patties, or the like.

An object of the present invention is to provide an improved nozzle structure adapted to be attached to meat grinding machines for extruding a uniform flat strip of ground meat.

Another object of the present invention is to provide a single nozzle structure which may be used to extrude strips of ground meat from a meat grinding machine in various desired thicknesses.

Still another object of the present invention is to provide an attachment for a meat grinding machine to extrude the meat therefrom in strip form, the attachment being easily disassembled for cleaning and reassembled for use.

A further object of the present invention is to provide a nozzle structure for a meat grinding machine, or the like, the nozzle structure having interchangeable plates to vary the thickness of the meat extruded therefrom in ribbon-like flat strips.

These and other objects of the present invention will appear more fully in the following specification, claims and drawings, in which:

Figure 1 is a front elevational view of the nozzle structure of the present invention;

Figure 2 is a side elevational view of the nozzle structure of the present invention attached to a meat grinding machine;

Figure 3 is an inverted plan view of the upper section of the housing of the nozzle structure showing the removable plate positioned therein;

Figure 4 is a perspective view of one of the removable plates;

Figure 5 is a cross-sectional view taken on the line 5—5 of Figure 2;

Figure 6 is an enlarged side elevational view of one of the removable plates; and Figure 7 is an enlarged side elevational view of another removable plate, this plate when positioned in the nozzle structure giving a different thickness to the strip being extruded therefrom than the plate of Figure 6.

Referring specifically to the drawings, wherein like characters or reference numerals represent like or similar parts, the nozzle structure of the present invention is generally designated by the numeral 10 and is adapted to be clamped onto an outlet of a meat grinding machine 12 or the like. In the drawings, only a portion of the outlet end of the meat grinding machine 12 is shown in broken lines, it being understood that the nozzle structure 10 can be attached to any conventional type of meat grinding machine. A collar or adapter 14 of nozzle structure 10, having a flange 16 is adapted to be secured to the meat grinding machine 12 by means of a suitable clamping ring 18. The portion of collar 14 which extends into the nozzle structure 10 is provided with a recess 19 on its outer periphery and this recess receives a channel 20 provided in the nozzle structure 10.

The nozzle structure 10 comprises an upper section 22 and a complemental lower section 24. The lower section 24 is provided with pivoted bolts 26 which are received in slots 28 provided in flanges 29 on the upper section and, thus, the two sections may be detachably secured together to form a unit housing adapted to be clamped onto the meat grinding machine 12. Wing nuts 31 fit onto the bolts 26 and retain the sections 22 and 24 together as a unit on the outlet of machine 12.

Lower section 24 is provided with a pair of spaced downwardly extending brackets 30 which are adapted to receive a roll of paper 32. An extension or tray 36 is provided on the lower section 24 and extends outwardly therefrom away from the meat grinding machine 12. Where the tray 36 joins the lower section 24 a transverse slot 38 is provided so that the paper on roll 32 may be fed upwardly through the slot 38, along the tray 36, so as to receive the strip of ground meat being extruded from the nozzle structure 10.

Referring now to Figure 2 it will be noted that each of the upper and lower sections 22 and 24 is provided with a recess 41 so as to form a chamber 40 extending through and providing infeed and outfeed ends for the nozzle 10. At the infeed end of the nozzle 10, the chamber 40 is circular in section, whereas at the outfeed or delivery end of the nozzle the chamber is a wide rectangular slot. The chamber 40, defined by the recesses 41 of the upper and lower sections 22 and 24 respectively, diverges from its circular infeed end to its rectangular outfeed end so that the area of the chamber adjacent the rectangular outfeed end is rectangular in longitudinal section.

As shown in Figures 1 and 2, a plate member 42 is supported in the throat of the outfeed end of the nozzle structure 10, the plate determining the thickness of the strip of meat extruded from the nozzle structure. In more detail, the recess 41 of the upper section 22 is notched adjacent the rectangular outfeed end, as indicated at 44. The plate 42 is provided with oppositely disposed outwardly extending ears or lugs 46 which are adapted to be received in the notches 44. Referring now to Figure 5, when the lugs 46 are received in the notches 44 their lower surface 48 is even with the lower surface 50 of the outfeed end of nozzle structure 10. The upper surface 52 of the plate 42 fits flush against the upper surface of the recess, whereas the lower surface of the plate 42 is spaced from the recessed surface of the lower section 24, as shown in Figure 1, to thereby define the outlet or delivery end of the nozzle structure. The lower surface of plate 52 is provided with a plurality of channels or grooves 54 which extend longitudinally of the chamber 40 and fair into the recessed wall of the upper section 22, as indicated at 56 in Figure 1.

When the upper sections 22 and 24 of the nozzle structure are disassembled, the plate 42 can be fitted into position with its lugs 46 being received in the notches 44, as shown in Figure 3. The lower section 24 is then placed on the upper section so that its mating surface, which is not notched, bears against the under surface 48 of the lugs 46 to firmly hold the plate 42 in position in the throat of the chamber 40. The wing nuts 31 are then tightened on the bolts 26 to retain the sections 22 and 24 as a cylindrical nozzle unit on the outlet of the machine 12.

Referring now to Figures 6 and 7 it will be noted that two sizes of plates 42 and 42' respectively are provided. Plate 42', shown in Figure 7, is identical with plate 42, shown in Figure 6, with the exception that it is thicker than the plate 42 and consequently when it is inserted into position in place of the plate 42 the strip of meat extruded will be thinner, as the opening at the feeding end of the nozzle will not be as thick. In order that the plates may be interchangeable the notches 46 and 46' of the plate shown in Figures 6 and 7 are positioned on the plates in a complementary manner. In other words, the upper surface 52 of plate 42 is the same distance from the upper surface of lug 46 as the upper surface 52' is from the upper surface of lug 46' of plate 42'. By providing interchangeable plates, the nozzle structure 10 may be utilized to extrude ground strips of meat of varying thickness, thus increasing the utility of the device. Further, by providing interchangeable plates which are completely removable from the nozzle structure, the plates, as well as the nozzle structure, may be thoroughly cleaned when the nozzle structure is disassembled.

The terminology used in this specification is for the purpose of description and not limitation, the scope of the invention being defined in the claims.

I claim:

1. In a nozzle structure adapted to be attached to a meat processing machine or the like, for extruding the product therefrom into a flat strip of desired width and thickness: a housing, said housing being formed of an upper section having a recess therein and a lower section having a recess therein, the recesses in the upper and lower sections defining a chamber in said housing extending therethrough and providing infeed and outfeed ends for the nozzle structure, the infeed end being substantially circular in section and the outfeed end being a wide rectangular slot, said chamber between the infeed and outfeed ends having walls diverging from the circular infeed end into a rectangular shape in lateral and longitudinal section at the outfeed end, at least one of said upper and lower sections having oppositely disposed notches in its recessed wall adjacent the outfeed end, a removable and replaceable flat plate of width substantially equal to the width of the rectangularly-shaped outfeed end and of a thickness substantially less than the thickness of said rectangularly-shaped outfeed end for determining thickness of the extruded product, oppositely disposed lugs on the ends of said plate, said lugs being adapted to fit in said notches to support said plate within the outfeed end of said nozzle with one of its surfaces contiguous with the surface of the recessed wall of the section in which it is supported and the other of its surfaces spaced from the recessed wall of the other of said sections, and means to detachably hold said upper and lower sections together as a unit with said plate positioned within said outfeed end of the housing.

2. A nozzle structure of the character described in claim 1, wherein said plate is provided with grooves in its surface spaced from the recessed wall of one of said sections, said grooves extending longitudinally of the chamber in said housing and fairing into the recessed wall of the section on which said plate is supported.

3. A nozzle structure of the character described in claim 1, wherein said lugs are of complementary size to said notches, said lugs when positioned in said notches abutting against the other of said sections.

References Cited in the file of this patent

UNITED STATES PATENTS

| | | |
|---|---|---|
| 1,699,086 | Winkie | Jan. 15, 1929 |
| 2,209,824 | Louisot et al. | July 30, 1940 |
| 2,694,222 | Spang | Nov. 16, 1954 |

FOREIGN PATENTS

| | | |
|---|---|---|
| 5,060 | Sweden | Aug. 7, 1893 |